(12) United States Patent
Ebner et al.

(10) Patent No.: US 12,412,408 B2
(45) Date of Patent: Sep. 9, 2025

(54) OBJECT DETECTION BASED ZONAL OCR IN AN AR CONTEXT

(71) Applicant: CareAR Holdings LLC, Norwalk, CT (US)

(72) Inventors: Fritz Ebner, Pittsford, NY (US); Ashish Tisgaonkar, Rochester, NY (US)

( * ) Notice: Subject to any disclaimer, the term of this patent is extended or adjusted under 35 U.S.C. 154(b) by 563 days.

(21) Appl. No.: 17/804,743

(22) Filed: May 31, 2022

(65) Prior Publication Data

US 2023/0386235 A1    Nov. 30, 2023

(51) Int. Cl.
*G06V 30/148* (2022.01)
*G06V 10/22* (2022.01)
*G06V 20/20* (2022.01)
*G06V 20/62* (2022.01)
*G06V 30/14* (2022.01)

(52) U.S. Cl.
CPC ............ *G06V 30/153* (2022.01); *G06V 10/22* (2022.01); *G06V 20/20* (2022.01); *G06V 20/62* (2022.01); *G06V 30/1444* (2022.01)

(58) Field of Classification Search
CPC .. G06V 30/153; G06V 30/1444; G06V 20/20; G06V 20/62; G06V 10/22

USPC ......................................................... 382/176
See application file for complete search history.

(56) References Cited

U.S. PATENT DOCUMENTS

| | | | |
|---|---|---|---|
| 10,740,613 B1 * | 8/2020 | Sinclair | G06T 1/0021 |
| 2014/0112527 A1 * | 4/2014 | Nister | G06V 20/635 |
| | | | 382/176 |
| 2017/0147881 A1 * | 5/2017 | Booth | G06V 10/457 |
| 2022/0286294 A1 * | 9/2022 | Grobler | H04L 9/3231 |

* cited by examiner

*Primary Examiner* — Gabriel I Garcia
(74) *Attorney, Agent, or Firm* — Fleit Intellectual Property Law; Jon Gibbons

(57) ABSTRACT

A system for zonal OCR in an AR context is provided having a monitored device having text in at least one zone for indicating device states; a computer receives a picture of said monitored device and said text and processes said picture to determine a plurality of feature points; a database is in data communication with said computer and stores a plurality of reference images with reference feature points and reference zones; the computer matches at least some of the plurality of feature points with at least some of the plurality of reference feature points to compute a homography matrix; the computer transforms the image into a transformed image using the homography matrix; the computer executes optical character recognition on a zone of the transformed image based on the reference zones to generate extracted text.

16 Claims, 6 Drawing Sheets

OBJECT DETECTION BASED ZONAL OCR IN AN AR CONTEXT

TECHNICAL FIELD

The present disclosure relates to a system and method to detect text in an augmented reality context. More particularly, the present disclosure relates to a system and method for zonal based OCR to support non-expert users in augmented reality workflows.

BACKGROUND

Augmented reality systems can be used to provide users with instruction workflows that help a user to perform tasks. Tasks can include validation steps, where the system can help detect whether the desired result of the task has been completed.

The "desired result"—or "end state" may be a special case of what can be termed "object states." An object state can be any detection of an object which can be differentiated from other states. For example, an object state might comprise a door which is open or closed, or a switch which is on or off.

Object states may be detected using a computer vision approach which employs deep learning networks. Currently, object states are only used to confirm that a task has been accomplished, for example if the back door of a printer has been opened, or if a toner drum has been removed. However, the notion of object state can be thought of as the 'context' of the object that allow an understanding of a global state of an object.

In AR service workflows, there is a need to decode information for a non-expert user. Sometimes that information is coded as text (static placards, or dynamic as in an LCD panel). OCR is typically used and applied for such use cases. Zones help extract relevant information based on the location within the document where the information should be contained.

SUMMARY

Accordingly, what is needed is a system and method to detect text in an augmented reality context.

The system and method should minimize the chance of misdetection of text, not be cumbersome or overly computationally expensive, and avoid confusing different known regions where text is located.

In one aspect of the present disclosure, a system for zonal OCR in an AR context is provided having a mobile device with a camera. The camera is configured to take an image of a device having text in at least one zone. A computer is in data communication with said mobile device. The computer is configured to receive said image and processes said image to determine a plurality of feature points. A database is in data communication with said computer. The database is configured to store a plurality of reference images with reference feature points and reference zones. The computer is configured to match at least some of the plurality of feature points with at least some of the plurality of reference feature points to compute a homography matrix. The computer is configured to transform the image into a transformed image using the homography matrix. The computer is configured to execute optical character recognition on zones of the transformed image based on the reference zones to generate extracted text. The mobile device is configured to display the extracted text.

In one aspect of the present disclosure, a system for zonal OCR in an AR context is provided having a monitored device having text in at least one zone configured to indicate device states. A computer is configured to receive a picture of said monitored device and said text and processes said picture to determine a plurality of feature points. A database is in data communication with said computer and is configured to store a plurality of reference images with reference feature points and reference zones. The computer is configured to match at least some of the plurality of feature points with at least some of the plurality of reference feature points to compute a homography matrix. The computer is configured to transform the image into a transformed image using the homography matrix. The computer is configured to execute optical character recognition on a zone of the transformed image based on the reference zones to generate extracted text.

Additional features and aspects of the present teachings will become apparent from the following detailed description of illustrative embodiments that proceeds with reference to the accompanying drawings. This summary is not intended to limit the scope of the present teachings, which is defined by the claims.

DETAILED DESCRIPTION

The present teachings are described more fully hereinafter with reference to the accompanying drawings, in which the present embodiments are shown. The following description is presented for illustrative purposes only and the present teachings should not be limited to these embodiments. Any system configuration, device configuration, or processor configuration satisfying the requirements described herein may be suitable for implementing the system and method to validate task completion of the present embodiments.

For purposes of explanation and not limitation, specific details are set forth such as particular structures, architectures, interfaces, techniques, etc. in order to provide a thorough understanding. In other instances, detailed descriptions of well-known devices and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

Figure 1:
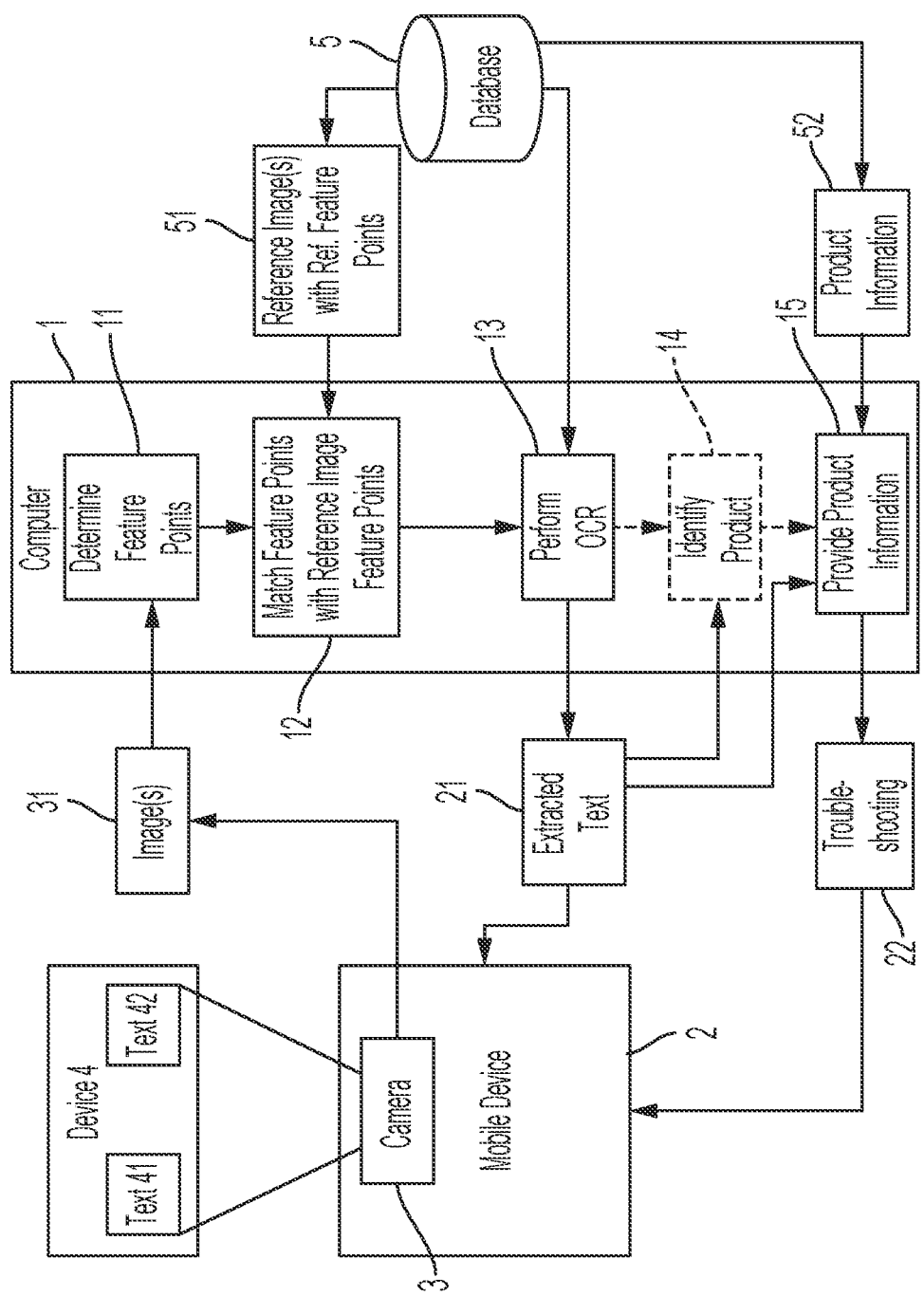
FIG. 1 is a schematic diagram of the present disclosure.

Referring to the figures in detail and first to FIG. 1, a system and method are provided to detect text in an augmented reality context. The system includes a computer 1, a device 4, and a database 5.

The computer 1 may include a processor, computer, remote computer, computer server, network, or any other computing resource. The computer 1 may include memory, input/output devices, storage, and communication interfaces—all connected by a communication bus. The storage may store application programs and data for use by the computer 1. Typical storage devices include hard-disk drives, flash memory devices, optical media, network and virtual storage devices, and the like. The communication interfaces may connect the system to any kind of data communications network, including either wired networks, wireless networks, or a combination thereof. The memory may be random access memory sufficiently large to hold necessary programming and data structures of the disclosed subject matter. The memory may constitute a single entity or comprise a plurality of modules. The input/output devices may be used to update and view information stored in a database 5, as described later in more detail The computer 1 may be in communication with the mobile device 2. The mobile device 2 may be a computer, desktop computer, laptop, smartphone, tablet, or other electronic device capable of transmitting data to or receiving data from the computer 1. The mobile device 2 may include a processor, computer, remote computer, computer server, network, or any other computing resource.

The system may be configured to communicate through a network with the mobile device 2 that is associated with a user who is using the system. The network may comprise a local-area network (LAN), a wide-area network (WAN), metropolitan-area network (MAN), and/or the Internet, and further may be characterized as being a private or public network. The mobile device 2 may be a mobile phone, smart glasses, AR/VR glasses, personal digital assistant, tablet, laptop, or the like. However, in other embodiments, the mobile device 2 may be a non-mobile device, for example a desktop computer. The mobile device 2 contains an application(s) which, when executed by a processor of the mobile device 2, delivers information from the system to the user and provides real-time guidance. The application(s) of the mobile device 2 generates graphical user interfaces for presenting information regarding the system, as discussed in more detail below, and facilitates user interaction with the graphical user interfaces(s) as described herein.

The mobile device 2 may have a camera 3. The camera may be capable of taking still photographs or video. For example, the camera 3 may include a CCD sensor, a CMOS sensor, or a combination of both. The camera 3 is adapted to capture at least one static image, or a video (a plurality of moving images), or a combination of both of the monitored device 4. The mobile device 2 may transmit the images 31 from the camera to the computer 1. The transmission may be real-time or may be delayed. Alternatively, the mobile device 2 may be a camera 3, and the images 31 may be stored in memory before being accessed for use as part of the system.

The camera 3 is used to take images of a device 4. Device 4 may be any type of device that includes regions of text. Regions of text may be on devices, nameplates, or screens. For example, device 4 may be a modem, router, printer, laptop, refrigerator, screen, sticker, vehicle, or any other device that uses text to communicate information. The number of regions of text on the device may vary.

The computer 1 may also be in communication with a database 5. The database 5 may store information regarding the system. The database 5 may be a storage drive or array accessible to computer 1, or cloud storage. The database 5 may be integrated into the computer 1, or the mobile device 2. The database 5 may store reference images with reference feature points and reference zones 51, and product information 52.

The computer 1 receives an image 31 taken by camera 3. This may be a still photograph or a frame of a video. The image 31 may be received over a network, such as the Internet, a WAN, a LAN, Bluetooth, or any other known network. The image 31 may be received via a memory card or USB memory device. Any receiver may forward the image 31 to the computer 1.

The computer 1 may use deep learning to recognize objects in the image 31. The deep learning may comprise a machine learning processor, a deep learning accelerator, an AI accelerator, and/or neural processor. The deep learning may be built on machine learning and/or artificial intelligence and may be based on artificial neural networks with representation and/or reinforcement learning. In some embodiments, the deep learning is a separate deep learning machine that uses neural networks. In some embodiments, the deep learning module may comprise computer instructions executable on a processor for determining an object. The deep learning module may include computer vision (with pattern recognition capability, for example) and may be trained to visually detect objects/components of the monitored device and their respective states and conditions from the image(s) 31. In addition, or alternatively, the deep learning may be trained to visually detect the monitored device as a whole and determine its state or condition from the image(s) 31.

The deep learning is configured to analyze the image 31, specifically identifying an object of the monitored device 4 within the image(s) 31 and detecting a state of the object by comparing the image(s) 31 to at least reference data 51. For example, in systems that use homography-based image alignment and registration, the database 5 may store reference images with reference feature points and reference zones. The reference data 51 may include predetermined labels and bounding boxes for an object of a monitored device 4. To generate reference images with reference feature points and reference zones 51, a picture is taken from a detected object bounding box to configure the detection parameters. Parameters may be generated to indicate where objects are in the sub-image defined by the bounding box. Feature points 51 may be extracted and saved from the sample image using a known algorithm, for example SIFT or SuperPoint.

Figure 4:
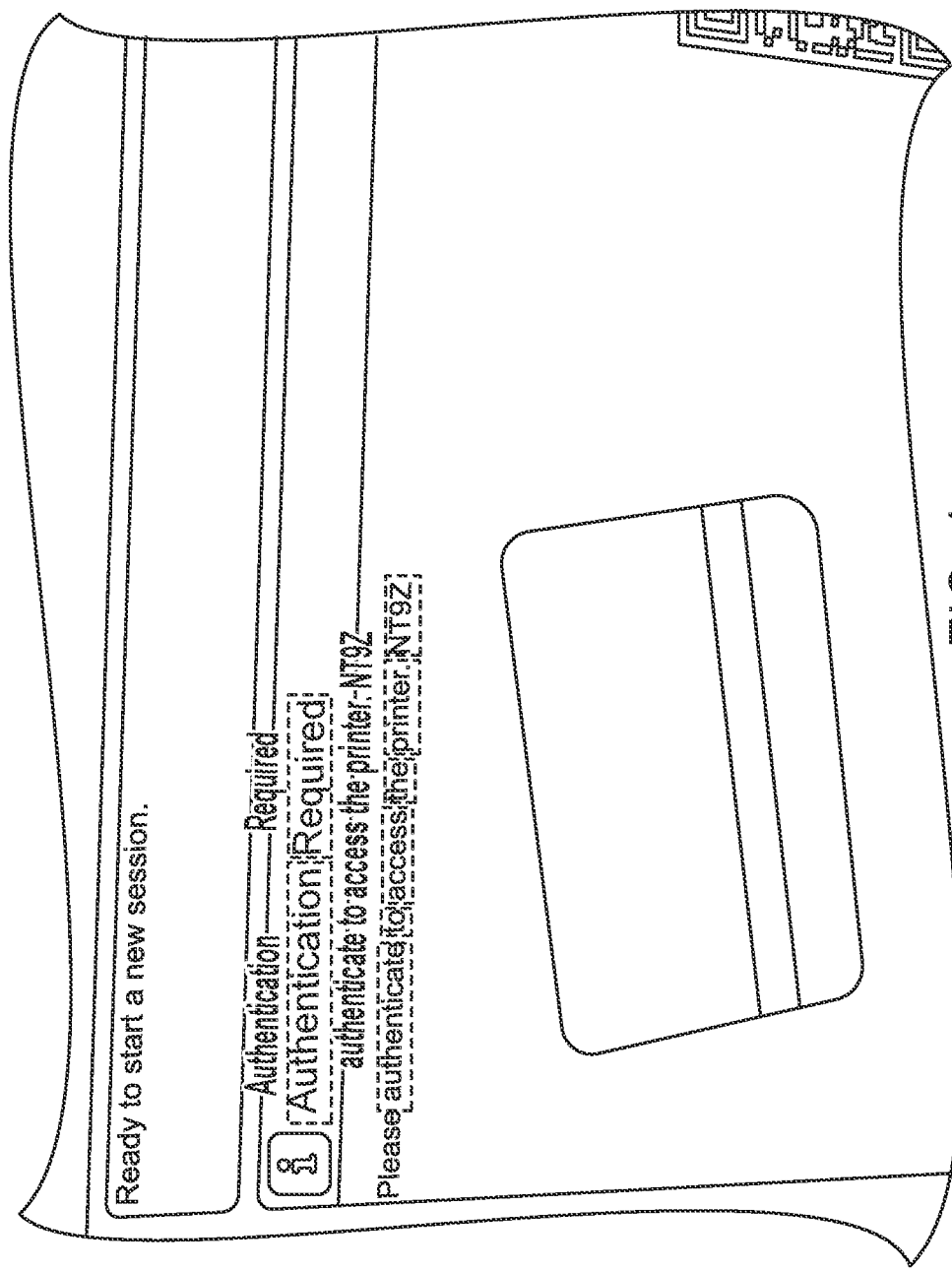
FIG. 4 is example of multiple regions of dynamic text on a screen, with detected text overlaid above bounding boxes.

In such a system, the computer 1 may retrieve reference images with reference feature points and reference zones 51 from the database 5. A sample reference image is shown in FIG. 4. The reference images with reference feature points and reference zones 51 may include predetermined labels and bounding boxes for a text zone on a device 4. To generate reference images with reference feature points and reference zones 51, a picture is taken from a detected 'text zone' bounding box to configure the OCR detection parameters. Deep learning may be used to identify the text panels and specific portions of text. Parameters may be generated to indicate where reference text zones are in the sub-image defined by the bounding box, and for OCR parameters for each text zone. For example, if a string is known to have a particular format, OCR parameters may include a regular expression or other pattern matching algorithm as part of the deep learning. Feature points 51 may be extracted and saved from the sample image using a known algorithm, for example SIFT or SuperPoint.

The following text shows an example of an OCR configuration:

```
{
    "Locations":[[95,117],[112,145]], [[132,117],[149,146]]]
    "Names":[« Serial Number », « Model Name »]
}
```

Locations indicate the relative locations of OCR fields in reference image. Names indicate the OCR field name and can be related to semantics of the object, e.g., a serial number or a model name, or some other information (e.g., fault numbers on an LCD screen).

The computer 1 determines feature points 11 of the image 31. This may be performed by using a deep learning model for object detection that has been trained to detect the objects and states of a particular product. The deep learning model for object detection may determine a bounding box whose label is associated with an 'text zone' in an image. The computer 1 may then extract a sub-image and determine feature points using a known algorithm (e.g., SIFT or SuperPoint). Notably, if an image 31 is framed to only capture a single text zone, no sub-image is necessary, and image 31 is used.

Figure 2:
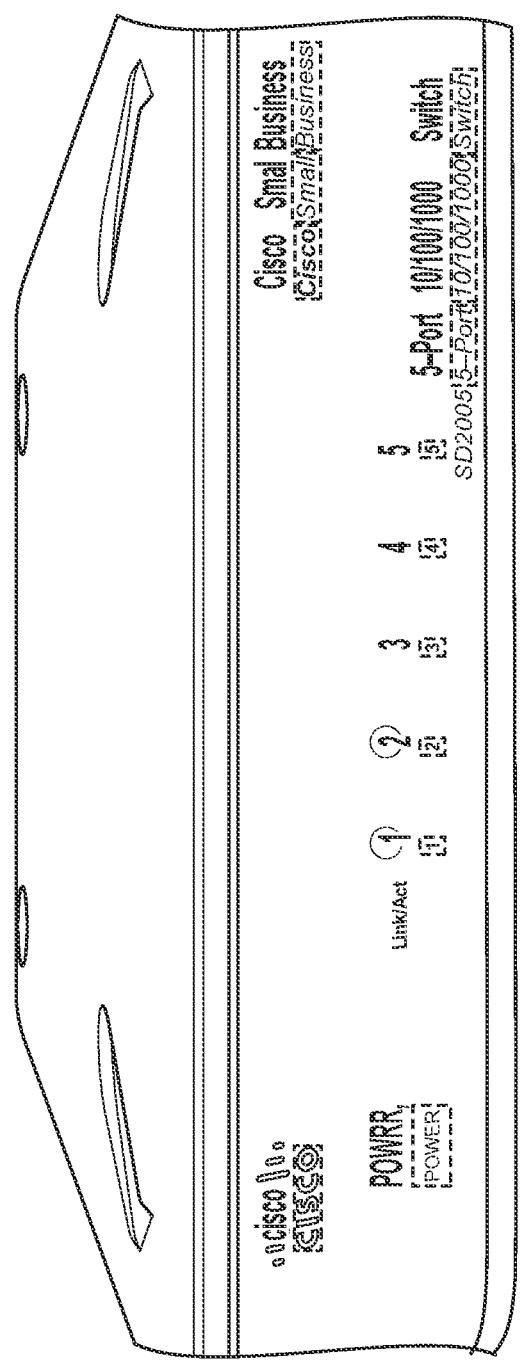
FIG. 2 is an example of multiple regions of text on an electronic device, with detected text overlaid above bounding boxes.

A sample image 31 of a device 4 is shown in FIG. 2. Bounding boxes are shown around the text zones. Other sample images are shown in FIGS. 2-5.

Figure 6:
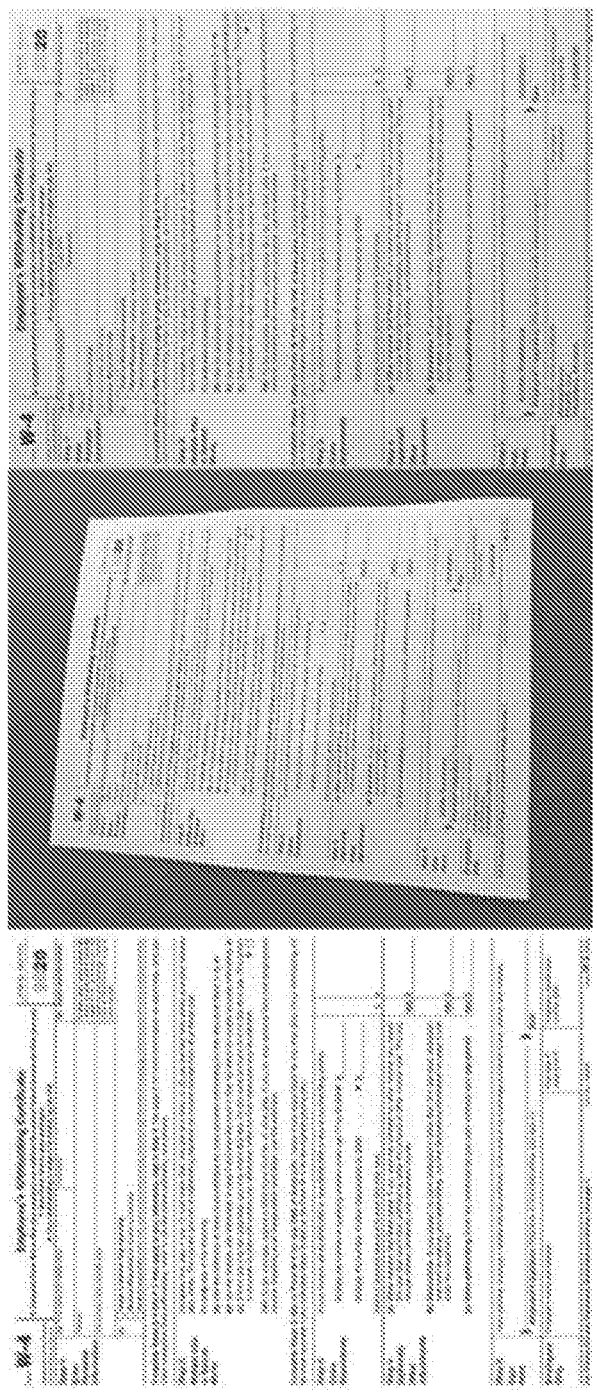
FIG. 6 is an example of a standard document (on the left), an image of a printout of that document (in the middle), and the result of homography of the image (on the right).

Image 31 is likely different from the reference image 51 in terms of the frame of reference. Therefore, there is a need to match image 31 to reference image 51. Image alignment and registration is known and can be performed using homography. Homography works by capturing feature points and descriptions in a reference image, then matching them in a scanned sample, then creating a transform that warps the sample image to the reference image (or vice versa). Homography may be used to determine a homography matrix to transform one image into the same perspective as another. As shown in FIG. 6, a known standard image may be provided on the left. An image, scan, or printout of that image may be provided in the middle. A corrected and remapped version of the image after homography is performed is shown on the right.

The computer 1 may match the determined feature points 11 with the reference image feature points 51. Upon doing so, the computer 1 may compute a homography matrix of image 31. The computer 1 may then use the reference zones 51 to determine where text exists within the image 31.

The computer 1 may perform OCR 13 on each of the OCR zones 13. As discussed above, each OCR zone may have its own OCR parameters to improve accuracy. Optionally, the computer 1 may match the OCR results with a regular expression or other pattern matching algorithm to validate correct structure of resulting text. The computer 1 may optionally perform OCR several times on a zone and use a voting strategy to get higher confidence that the extracted text is correct.

Figure 3:
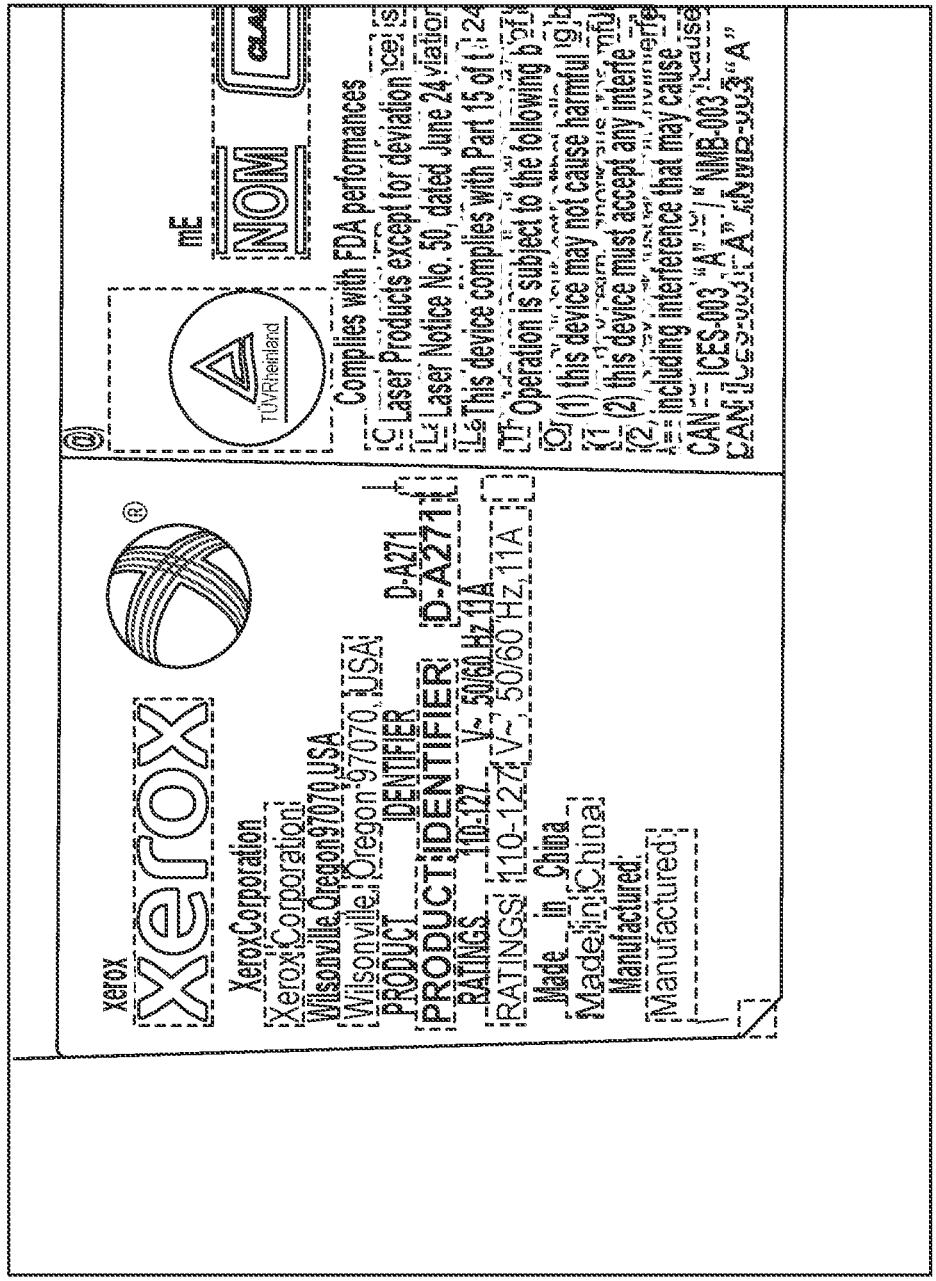
FIG. 3 is an example of multiple regions of text on a nameplate, with detected text overlaid above bounding boxes.
Figure 5:
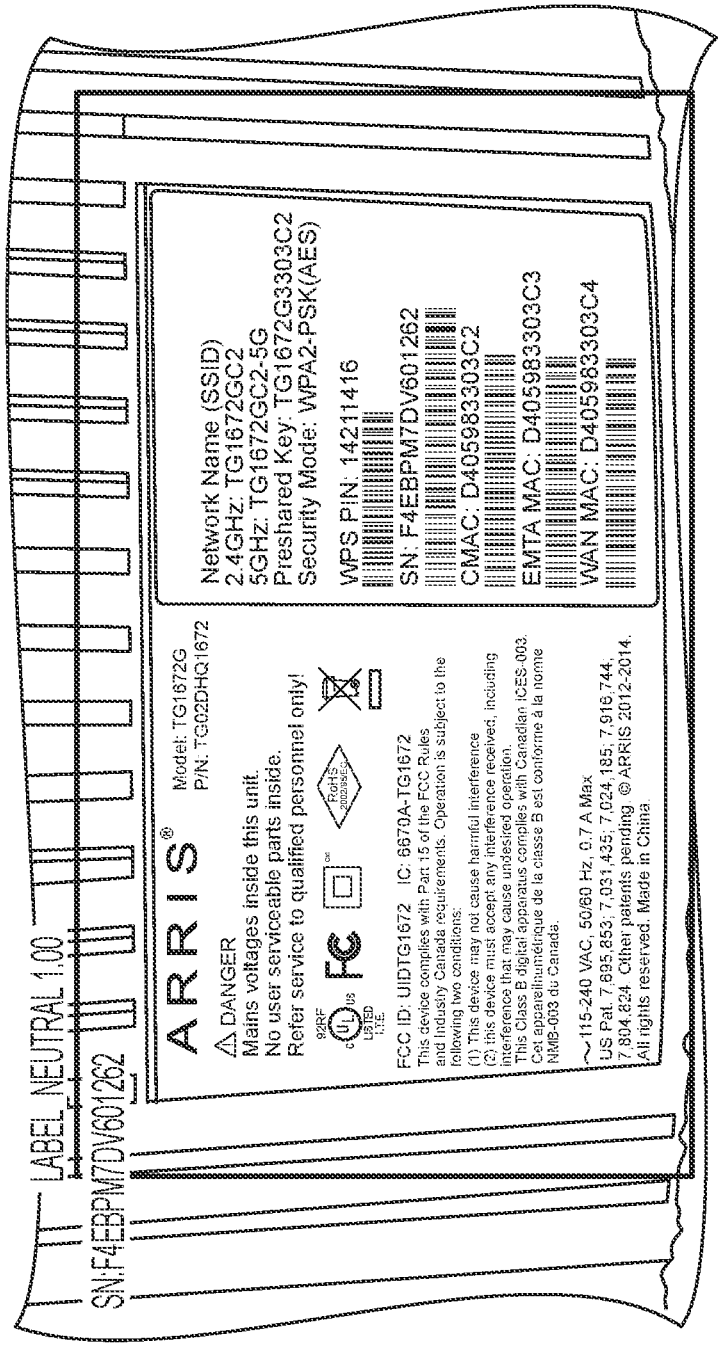
FIG. 5 is an example of multiple regions of text on a nameplate, with important information extracted.

The computer 1 may provide the extracted text 21 to the mobile device 2. The mobile device 2 may display the extracted text 21 of the LEDs to the user. For example, the mobile device may show the extracted text 21 over the live image of the product (as shown in FIGS. 2-4). As shown in FIG. 5, the mobile device may single out important text (such as a serial number) for display.

Optionally, the computer 1 may use the extracted text to identify 15 the device 4, either by product number, product name, or another known identifier. To do so, the computer may retrieve information from the database 5 to match the extracted text to known data.

The computer 1 may use the extracted text 21, with or without the optional identifying step, to retrieve product information 52 from the database 5. The computer may provide the product information 16 to the mobile device 2. In addition, or alternatively, the computer may use the extracted text 16 and product information 52 to identify and provide additional information, such as troubleshooting steps, to the mobile device 2. The mobile device may display any of the above to the user.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect. The present disclosure is to be considered as an example of the disclosure and is not intended to limit the disclosure to a specific embodiment illustrated by the figures above or description below.

For purposes of explanation and not limitation, specific details are set forth such as particular architectures, interfaces, techniques, etc. to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first," "second," etc. for different features/components of the present disclosure are only intended to distinguish the features/components from other similar features/components and not to impart any order or hierarchy to the features/components. As used herein, the term "and/or" includes any and all combinations of one or more of the associated listed items. As used herein, the term "application" is intended to be interchangeable with the term "invention," unless context clearly indicates otherwise.

To aid the Patent Office and any readers of any patent issued on this application in interpreting the claims appended hereto, Applicant that it does not intend any of the claims or claim elements to invoke 35 U.S.C. 112(f) unless the words "means for" or "step for" are explicitly used in the particular claim.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings. In describing the disclosure, it will be understood that a number of techniques and steps are disclosed. Each of these has individual benefits and each can also be used in conjunction with one, more, or all of the other disclosed techniques. Accordingly, for the sake of clarity, this description refrains from repeating every possible combination of the individual steps in an unnecessary fashion. Nevertheless, the specification and claims should be read with the understanding that such combinations are entirely within the scope of the claims.

What is claimed is:

1. A system for zonal optical character recognition (OCR) in an augmented reality (AR) context, comprising:
   a mobile device having a camera;
   the camera configured to take an image of a device having text in at least one zone;
   a computer in data communication with the mobile device, and
   a database in data communication with the computer and configured to
   store a plurality of reference images with reference feature points and reference zones,
   wherein the computer is configured to:
      receive the image;
      process the image to determine a plurality of feature points;
      match at least some of the plurality of feature points with one or more of the reference feature points to compute a homography matrix;
      transform the image into a transformed image using the homography matrix; and
      execute optical character recognition on zones of the transformed image based on the reference zones to generate extracted text, and
   wherein the mobile device is configured to display the extracted text.

2. The system of claim 1, wherein the database is further configured to include
   user information associated with a product and user information including at least one of setup instructions, troubleshooting steps, or use instructions, and
      wherein the mobile device is configured to display the user information.

3. The system of claim 2, wherein the user information is overlaid on a picture of the product.

4. The system of claim 1, wherein the database further is further configured to store pattern matching mechanisms associated with reference zones, and
   wherein
      the computer is further configured to compare the extracted text against a pattern matching mechanism associated with an applicable reference zone to determine matched extracted text.

5. The system of claim 4, wherein the computer is further configured to compare the matched extracted text against a plurality of previous detections to determine a high confidence result.

6. The system of claim 1, wherein the computer is further configured to process the extracted text to determine a product type of the device.

7. The system of claim 6, wherein the computer is configured determine the product type based on at least one of a serial number or a model number.

8. The system of claim 1, wherein the camera is a video camera.

9. The system of claim 8, wherein the image is a frame of a video.

10. The system of claim 9, wherein the computer is further configured to process a second frame of the video to refine the extracted text.

11. The system of claim 1, wherein
   the computer is further configured to:
      process at least one frame of the image to determine a bounding box in which the text resides;
      process only a portion of the frame within the bounding box to determine the plurality of feature points; and
      process only the portion of the frame within the bounding box to determine the extracted text.

12. A system for zonal optical character cognition (OCR) in an augmented reality (AR) context, comprising:
   a monitored device having text in at least one zone configured to indicate device states;
   a computer; and
   a database in data communication with the computer and configure to
   store a plurality of reference images with reference feature points and reference zones,
   wherein the computer is configured to:
      receive an image of the monitored device and the text;
      process the image to determine a plurality of feature points;
      match at least some of the plurality of feature points with at least one or more of the reference feature points to compute a homography matrix;
      transform the image into a transformed image using the homography matrix; and
      execute optical character recognition on a zone of the transformed image based on the reference zones to generate extracted text.

13. The system of claim 12, wherein the image is provided to the computer by a mobile device.

14. The system of claim 12, further comprising a receiver configured to accept the image from a remote device and transmit the image to the computer.

15. The system of claim 12, wherein the computer is further configured to:
   process at least one frame of the image to determine a bounding box in which the text resides;
   process only a portion of the frame within the bounding box to determine the plurality of feature points; and
   process only the portion of the frame within the bounding box to determine the extracted text.

16. A method for zonal optical character recognition (OCR) in an augmented reality (AR) context, comprising:
   obtaining an image of a device having text in at least one zone;
   processing the image to determine a plurality of feature points;
   matching at least some of the plurality of feature points with one or more reference feature points to compute a homography matrix;
   transforming the image into a transformed image using the homography matrix; and
   executing optical character recognition on zones of the transformed image based on one or more reference zones from one or more reference images, including the one or more reference points, to generate extracted text; and
   displaying the extracted text.

* * * * *